R. R. Fenner,
Steam-Boiler Water-Heater.

N° 83,370.          Patented Oct. 27, 1868.

Witnesses:
F. C. Ashkettle
Wm. A. Morgan

Inventor:
R. R. Fenner
per Munn & Co
Attorneys

United States Patent Office.

R. R. FENNER, OF URBANA, ILLINOIS, ASSIGNOR TO HIMSELF AND ELI HALBERSTADT, OF SAME PLACE.

Letters Patent No. 83,370, dated October 27, 1868.

IMPROVEMENT IN FEED-WATER HEATERS FOR STEAM-GENERATORS.

The Schedule referred to in these Letters Patent and making part of the same.

*To all whom it may concern:*

Be it known that I, R. R. FENNER, of Urbana, in the county of Champaign, and State of Illinois, have invented a new and useful Improvement in Filters and Heaters; and I do hereby declare that the following is a full, clear, and exact description thereof, which will enable others skilled in the art to make and use the same, reference being had to the accompanying drawings, forming part of this specification.

The nature of my invention relates to improvements in apparatus for heating and filtering water, to be used in generating steam for steam-engines, and other like purposes, whereby it is designed to heat the same in a cheap and effective manner, and, at the same time, separate the lime from it, to prevent incrustation in the boiler; and it consists in pieces of cast-iron, placed within the heater, by the presence of which in the heater, the lime which is in a fluid state, will, at a certain degree of heat, become crystallized and adhere to the pieces of iron to a great extent. The heated water is then passed through a filter, which separates the balance of the lime, as will be more fully described on reference to the accompanying drawings, wherein—

Similar letters of reference indicate corresponding parts.

Figure 1:
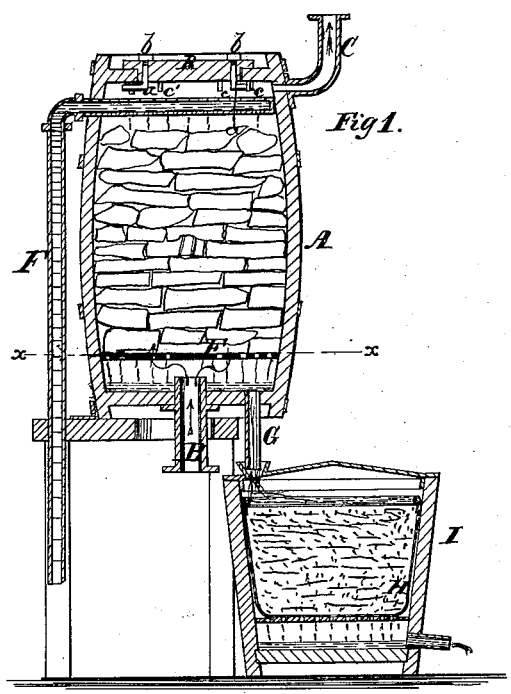
Figure 1 represents a central sectional elevation of my improved apparatus.
Figure 2:
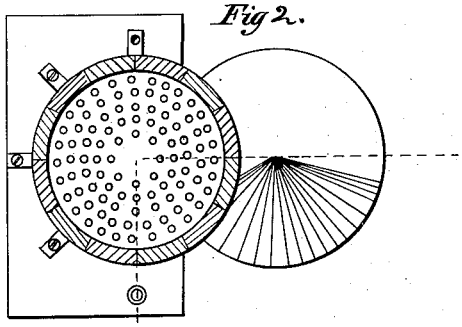
Figure 2 represents a section on the line *x–x* of fig. 1.

A represents a vessel, provided with an ingress-pipe, B, which communicates with the steam-engine. C represents an exhaust-pipe. D represents pieces of cast-iron, placed within the vessel A, and E represents a cold-water-supply pipe, through which the water is supplied in jets to the interior of the vessel A. F represents a perforated plate within the vessel, elevated slightly above the bottom of the same. The central portion of the said plate, against which the steam is discharged, is not perforated, whereby the steam is caused to spread, and be diffused throughout the whole interior space of the heater D. G represents a pipe, communicating with the filter H, which latter consists of a sack of woven fabric, arranged within the tub I, containing sawdust and straw. K represents a man-hole-cover, for the top of the heater, which is secured to the same by the bolts *a* and nuts *b*, the lower ends of the bolts being bent at right angles, so that when the cover is set down to its place, they may be turned partly around, so as to take under the lower side of the head, and be screwed up tightly to it, the pins C, on the under side of the head, and C', on the under side of the man-hole-cover, preventing the bolt-heads from turning too far each way.

I claim as new, and desire to secure by Letters Patent—

The arrangement of the supply-pipe E, exhaust-pipe C, ingress-pipe B, water-delivery pipe G, filter I, and vessel A, substantially as herein set forth.

R. R. FENNER.

Witnesses:
D. B. HALBERSTADT,
A. O. CLAPP.